3,514,651
ELECTRICAL COMPONENT
Kenneth Barry Jarrett, Codicote, Hitchin, England, assignor to Imperial Chemical Industries Limited, London, England, a corporation of Great Britain
No Drawing. Continuation of application Ser. No. 525,111, Feb. 4, 1966. This application Apr. 2, 1969, Ser. No. 812,928
Claims priority, application Great Britain, Feb. 22, 1965, 7,596/65
Int. Cl. H02k *3/36, 15/00*
U.S. Cl. 310—215
7 Claims

ABSTRACT OF THE DISCLOSURE

Slot liners for insulating coils of dynamo electric machines having a reduced tendency to fibrillate and delaminate are provided. The slot liners are formed of lengths of polyethylene terephthalate film which has therein a filler selected from titanium dioxide and china clay, the particle sizes of which are between 0.1 and 2.0 microns and the amount of the particles in the film is between 0.25 and 10% by weight.

---

This application is a continuation of application Ser. No. 525,111 filed Feb. 4, 1966, now abandoned.

This invention relates to improved electrical components, in particular to slot liners for the core members of dynamo electric machines.

An essential part of a dynamo electric machine is a core of magnetic material. Such cores are often provided with a plurality of slots to receive the coils of current-carrying wire which will generate the flux required in the core. It is imperative that the coils be insulated from the core and in order to do this it is known to use a slot liner comprising polyethylene terephthalate either alone or in the form of a laminate with, for example, paper.

Such polyethylene terephthalate slot liners are normally produced by bending inwards the margins of a tape of film to form cuffs at each edge of the tape. The cuffed tape is then cut to the correct size, bent to the shape required and inserted in the slot. This series of operations causes high stress in the film which tends to crack and fibrillate and thus the insulating effect between the core and the windings of the machine made with such slot liners is impaired.

It is an object of this invention to overcome the above defects.

According to the present invention I provide a slot liner for a dynamo electric machine comprising a film of polyethylene terephthalate containing between 0.25 and 10% by weight of inert particles of between 0.1–2.0 microns average particle size.

Film containing less than 0.25% of inert particles does not successfully inhibit fibrillation and film containing more than 10% of such particles cannot conveniently be produced.

I have found that the tendency for delamination to occur is only decreased to any appreciable extent if the inert particles are of average particle size less than or equal to 2.0 microns.

By "inert particles" I mean substances that are substantially insoluble in water, unaffected by exposure to the atmosphere and moisture and undergo no chemical reaction with polyethylene terephthalate even at temperatures up to 300° C. The inert particles are suitable for incorporation into the polymer or the polymer-forming reactants before the polymer is converted into film by the conventional method of melt extrusion.

Very suitable inert particulate materials are titanium dioxide, silicates or silico-aluminates such as china clay. My preferred inert particulate material is titanium dioxide with particle sizes in the range given above; this material leads to a slot liner of a particularly good colour and glossy appearance.

The polyethylene terephthalate film containing the inert particles may be oriented in either one or both directions in the plane of the film; preferably it is biaxially oriented by stretching the amorphous film made in known manner at a temperature above its second order transition temperature in each of two mutually perpendicular directions. The oriented film is preferably heat set by heating it under tension at a temperature of from 150–250° C., whereby its dimensional stability at high temperatures is improved.

As mentioned above, the inert particulate material may be incorporated in the polymer-forming reactants. In this preferred case the particles of inert material are ball milled with ethylene glycol and the suspension produced added to the ethylene glycol and dimethyl terephthalate used in the preparation of the polymer.

Our invention is illustrated but in no way limited by reference to the following examples.

EXAMPLE I

A dispersion of titanium dioxide of particle size 0.2 micron in ethylene glycol was prepared in the following manner. 0.5 lb. of titanium dioxide was mixed with ethylene glycol (1.5 lb.) and introduced into a quart capacity stone jar which contained 6 mm. glass beads, the bulk volume of which was equal to a third of the volume of the jar. The jar was sealed and set to rotate at 20 revolutions per minute. After 24 hours the milling was terminated and good dispersion was found to have been effected.

Dimethyl terephthalate (100 parts) was melted and mixed with ethylene glycol (71 parts) and reacted according to the usual ester interchange process for the manufacture of polyethylene terephthalate. At a batch temperature of 150° C., manganese acetate (0.05%) of the dimethyl terephthalate charge) and antimony trioxide (0.04% of the dimethyl terephthalate charge) each mixed with ethylene glycol were added to the melt. Following the addition of these catalysts, the above titanium dioxide dispersion in glycol (4 parts) was added and washed through the tundish with a small quantity of ethylene glycol. The ester interchange was completed by the removal as vapour of approximately 28 parts of methanol and 10 parts of ethylene glycol. Ten minutes before the transfer of the melt to the polycondensation autoclave, phosphorous acid (0.037% of the dimethyl terephthalate charge) was added to the melt as an emulsion in ethylene glycol. After transfer, the melt was polycondensed under vacuum at 285° C., cast into a ribbon, cooled under water and diced. The intrinsic viscosity measured in 1% orthochloro-phenol at 25° C. was 0.649.

Since it was desired to make film containing ½% of titanium dioxide, the dice of the masterbatch made as described above was intimately mixed in suitable proportion with dice of identcally produced polyethylene terephthalate but containing no titanium dioxide. After drying, the polymer was melt extruded into film and the quenched film was reheated to 90–110° C. and drawn at a ratio of 3.5:1 in the machine and transverse directions to give film of 1000 gauge thickness. The biaxially oriented film was heat set at constant dimensions at a temperature of 210° C.

It was found that when folded to the required shape for slot liners the tendency of the filled film to delaminate along the line of the fold was considerably less than the tendency of unfilled film.

EXAMPLE II

A dispersion of china clay of particle size 2 microns in ethylene glycol was prepared by the method and converted into 1000 gauge film by the process set out in Example I. The masterbatch was diluted with various amounts of clay-free polymer so as to obtain films containing a varying amount of clay. Films containing various quantities of china clay of particle size 4 microns were made in a similar manner.

The samples of film were cut into 2 inch strips and cuffed in a cuffing jig (as illustrated at page 24 of the booklet entitled, "Melinex Polyester Film," issued by Imperial Chemical Industries Limited, Plastics Division). After cuffing, the percentage delamination of the samples was measured by opening the fold and observing over what percentage of the length of the fold delamination had occurred. Where delamination had occurred a white spot appeared in the film. The results of carrying out these tests on the samples of film obtained from Examples I and II are shown in Table I.

TABLE I

| Nature of filler | Size of filler particles (microns) | Percent of filler by weight | Percent delamination |
|---|---|---|---|
| None | | | 67 |
| Titanium dioxide | 0.2 | ½ | 3 |
| China clay | 2 | ½ | 12 |
| Do | 4 | 0.2 | 97 |
| Do | 4 | 1 | 99 |

Thus we see that delamination is increased if the particle size of the filler is greater than about 3 microns and substantially decreased if the particle size of the filler is 2 microns or smaller.

What is claimed is:

1. A slot liner of insulating the coils contained in a slot of a core of a dynamo electric machine, which slot liner has a reduced tendency to fibrillate and delaminate, comprising a length of a film of polyethylene terephthalate, said length having cuffs at the margins thereof of each edge of the said length, said length being bent to a shape for inserting into a slot of a core, and said length of polyethylene terephthalate film having therein inert particles selected from the group consisting of particles of titanium dioxide and particles of china clay and wherein between 0.25 and 10% by weight of the particles is contained in the said length of polyethylene terephthalate film and the particles have an average particle size of between 0.1 and 2.0 microns.

2. The slot liner of claim 1 wherein the said length of polyethylene terephthalate film is an oriented and heat set film.

3. The slot liner of claim 1 wherein the orientation is biaxial orientation.

4. The slot liner of claim 3 wherein the film is heat set at a temperature of between 150° to 250° C.

5. A slot liner according to claim 1 in which the inert particles are of titanium dioxide.

6. A process for the manufacture of a slot liner for insulating the coils contained in a slot of a core of a dynamo electric machine comprising bending inwards the margins of a tape of a film of polyethylene terephthalate, cutting the tape to the required size, bending the tape to a shape for inserting into a slot of a core, and wherein the tape is oriented and heat set, and contains inert particles selected from the group consisting of particles of china clay and particles of titanium dioxide and wherein 0.25 to 10% by weight of the particles are contained in the tape and the particles have an average particle size of between 0.1 and 2.0 microns.

7. The process of claim 6 wherein the orientation is biaxial and the heat setting is at 150° to 250° C.

References Cited

UNITED STATES PATENTS 3,201,506   8/1965   Bills.
3,221,226   11/1965   Kennedy et al.

FOREIGN PATENTS 647,229   8/1962   Canada.

MORRIS LIEBMAN, Primary Examiner

S. L. FOX, Assistant Examiner

U.S. Cl. X.R.

29—596; 260—40